C. PLETSCHER.
MACHINE FOR FOLDING NOODLES.
APPLICATION FILED JUNE 9, 1914.

1,128,900.

Patented Feb. 16, 1915.
13 SHEETS—SHEET 2.

Fig. 2.

Witnesses

Inventor
Carl Pletscher
by his Attorneys

C. PLETSCHER.
MACHINE FOR FOLDING NOODLES.
APPLICATION FILED JUNE 9, 1914.

1,128,900.

Patented Feb. 16, 1915.
13 SHEETS—SHEET 8.

Witnesses

Inventor
Carl Pletscher
by his Attorneys

C. PLETSCHER.
MACHINE FOR FOLDING NOODLES.
APPLICATION FILED JUNE 9, 1914.

1,128,900.

Patented Feb. 16, 1915.
13 SHEETS—SHEET 10.

Inventor
Carl Pletscher
by his Attorneys

C. PLETSCHER.
MACHINE FOR FOLDING NOODLES.
APPLICATION FILED JUNE 9, 1914.

1,128,900.

Patented Feb. 16, 1915.
13 SHEETS—SHEET 13.

Carl Pletscher

UNITED STATES PATENT OFFICE.

CARL PLETSCHER, OF SAGINAW, MICHIGAN, ASSIGNOR TO WERNER & PFLEIDERER COMPANY, OF SAGINAW, MICHIGAN.

MACHINE FOR FOLDING NOODLES.

1,128,900.  Specification of Letters Patent.  Patented Feb. 16, 1915.

Application filed June 9, 1914. Serial No. 843,983.

*To all whom it may concern:*

Be it known that I, CARL PLETSCHER, a citizen of the Republic of Switzerland, residing in Saginaw, in the county of Saginaw and State of Michigan, have invented certain new and useful Improvements in Machines for Folding Noodles, of which the following is a specification.

This invention relates to machines of the kind employed for folding strips or ribbons of dough into loaves or bunches, and particularly to that class of such machines that are adapted to fold noodles. In such machines it is usual to wind a sheet of dough on a horizontal shaft or arbor from which it is led through feed rolls which advance the sheet and reduce it to the desired thickness and which deliver the sheet thus prepared to cutters which divide it into strips or ribbons which latter are subsequently cut into proper lengths to form noodles.

According to my invention I produce strips of dough or noodles in the way just described and I then fold them in a novel way by novel mechanism which receives the noodles from the cutters, folds them and delivers them in a folded condition to carriers which convey them away from the folding mechanism.

The machine embodying my improvements involves no substantial change in the cutting mechanism, but novel folding mechanism is adapted to receive the noodles after they are severed into proper lengths, cause them to assume diagonal positions relatively to the line of movement of the folders and then fold them by first turning the end portions over upon the middle portions of the noodles and then folding along the middle line of the noodles to produce completely folded noodles having four thicknesses of dough.

The folding mechanism comprises a series of tables which receive the strips of dough from the cutters and these tables are reciprocated in a horizontal plane beneath the cutting mechanism and during such reciprocation fold the noodles in the manner before specified. The mechanism is so constructed that noodles are folded during each back and forth movement of the tables and at each stroke folded noodles are delivered to a conveyer which carries them away from the machine.

In the accompanying drawings.

Figure 1:
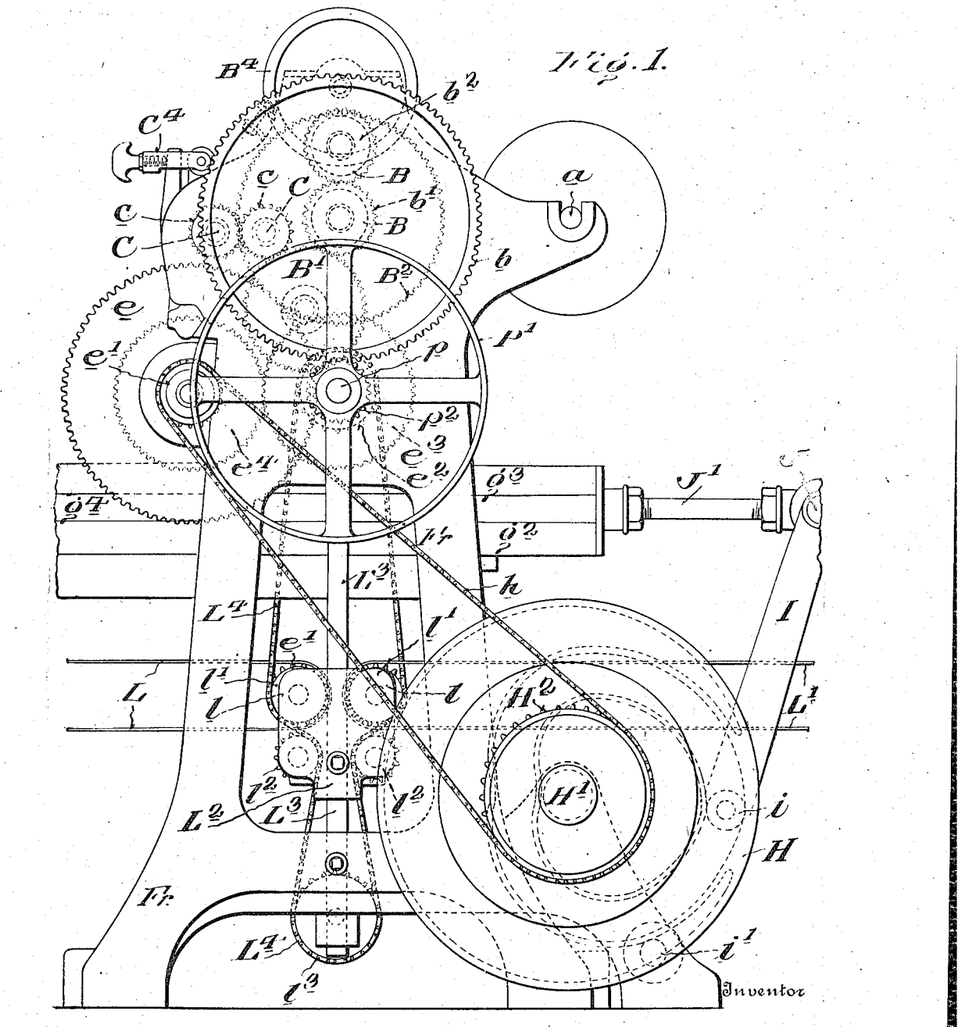
Figure 1 shows a side elevation of a noodle-making machine embodying my improvements.
Figure 2:
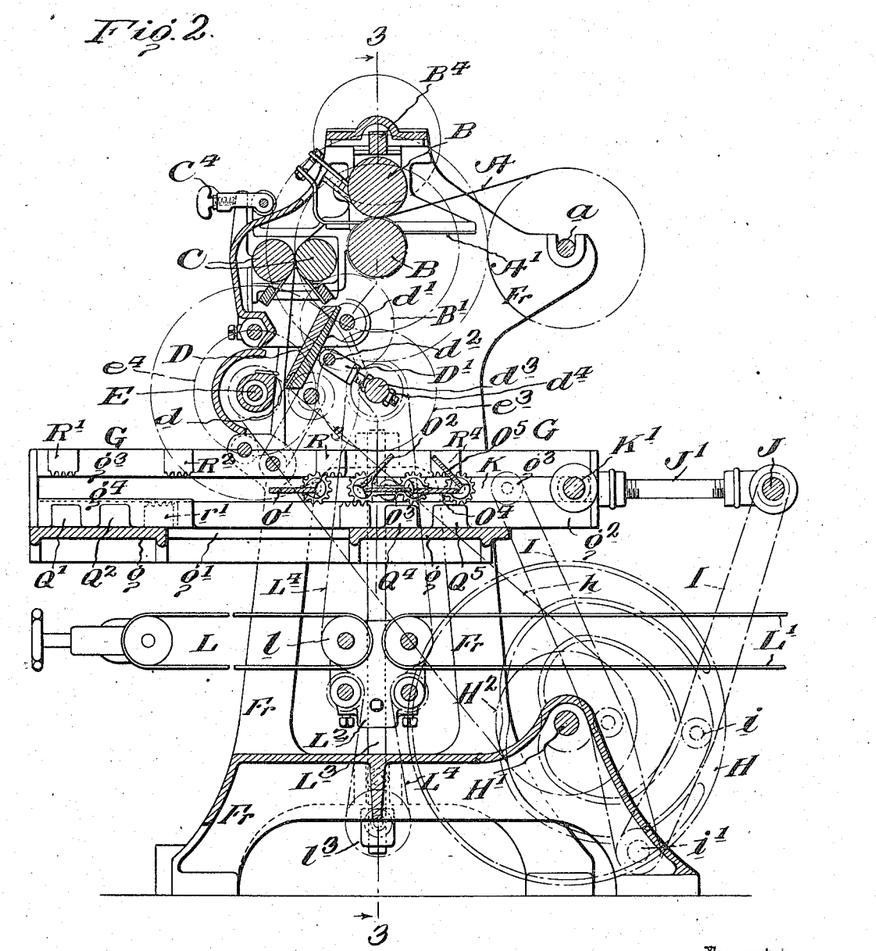
Fig. 2 shows a vertical longitudinal section thereof.
Figure 3:
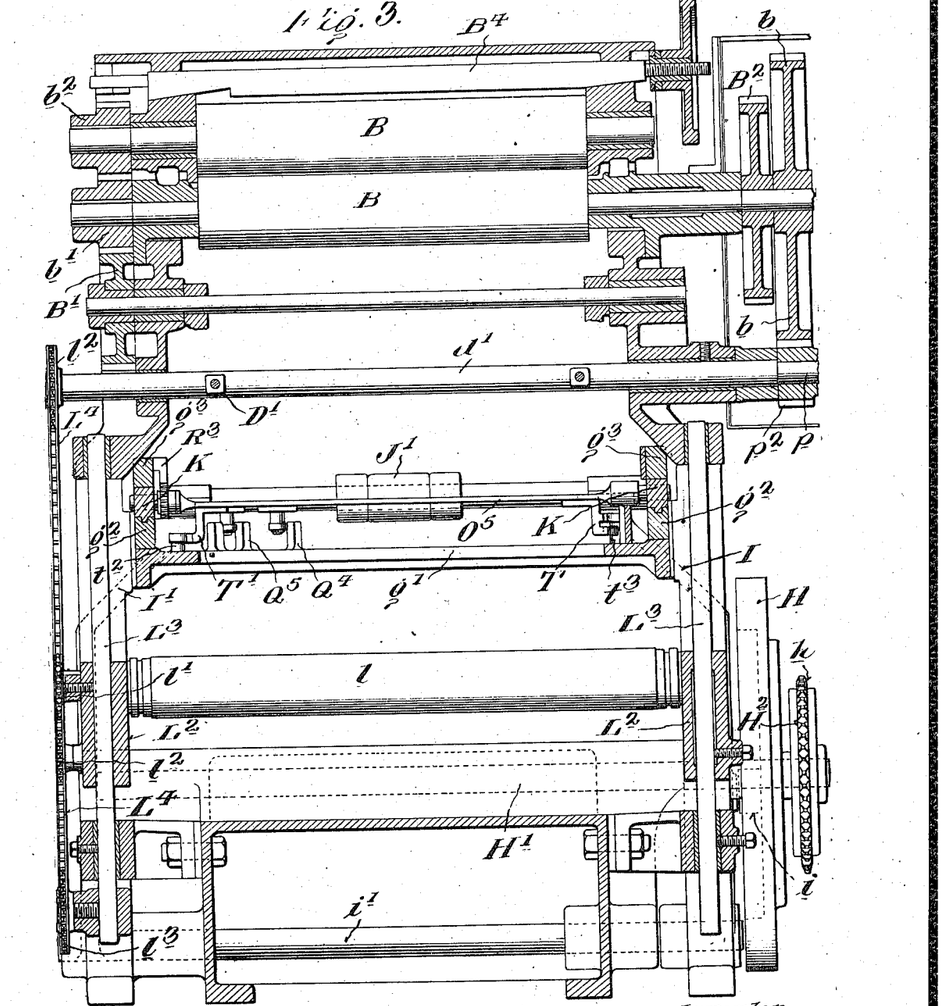
Fig. 3 shows a vertical section on the line 3—3 of Fig. 2.
Figure 4:
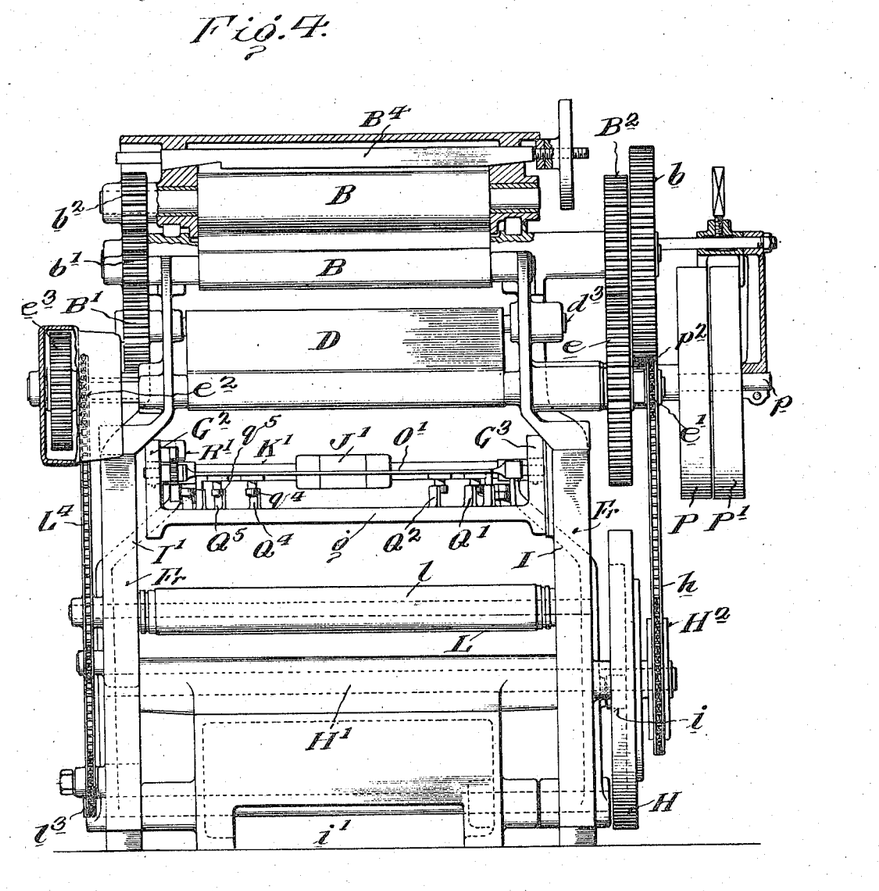
Fig. 4 is a view partly in front elevation and partly in vertical section of the machine.

A sheet of dough A is wound upon an arbor $a$ and led over a table A' through rollers B which press it to the desired thickness and advance it to rotary cutters C which divide the dough sheet into strips or ribbons of suitable width. The dough strips descend across the ends of a guide-board D which is adjustable to vary the position of its front edge $d$. This adjustment may be obtained in various ways. It will be observed, however, that in the construction shown the guide-board is pivotally connected with the frame of the machine at $d'$ and it is jointed at $d^2$ to an arm D' which extends through a horizontally arranged shaft $d^3$. By means of adjusting nuts $d^4$ the length of this arm may be varied and thus vary the position of the edge $d$. When the guide-board D is made wide two such arms D' may be employed, and both of said arms may be connected with the shaft $d^3$ in the manner specified. This construction is indicated in Fig. 3.

E indicates a rotary knife which is operated to sever the strips or ribbons of dough into suitable lengths. Fast and loose pulleys P, P' are mounted on a shaft $p$ supported in the main frame, the pulley P being fast on said shaft. The shaft $p$ carries a pinion $p^2$, meshing with a spur wheel $b$ on one end of the lower feed roll B on the opposite end of which is another pinion $b'$ meshing with a pinion $p^2$ connected with the upper feed roll B. An intermediate spur wheel B' meshes with the pinion $b'$ and also with a spur wheel $c$ on the shaft of one of the cutters C which is also geared to the opposing cutter in the manner shown. The shaft of the lower roller B carries a spur wheel B² which meshes with a pinion $e$ on the shaft of the cutter or rotary knife E. In this way the rolls B, cutters C and rotary knife E are driven from the shaft $p$.

The devices B⁴ for pressing down the upper feed roll B and the devices C⁴ for adjusting the cutters C form no part of my invention and need not be described in detail.

The frame of the machine is indicated by Fr and about midway between its upper and lower ends the main frame supports the needle-folding mechanism, the details of which will be hereinafter described.

Figure 5:
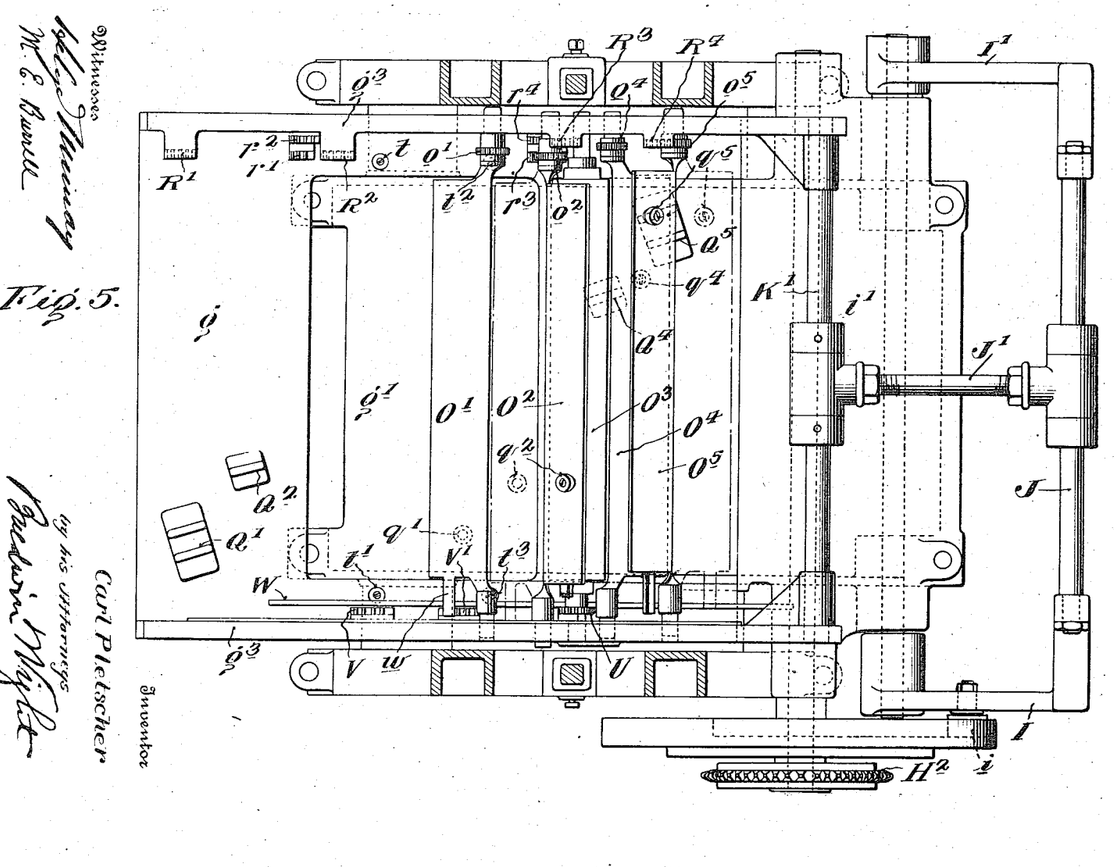
Fig. 5 shows a transverse section of the machine and illustrates in plan view the series of tables and their operating mechanism.

A shaft H' mounted in bearings in the lower portion of the main frame carries a cam disk H and the shaft H' carries a sprocket wheel H² connected by a chain $h$ with a sprocket wheel $e'$ on the shaft of the rotary cutter E. The cam H engages a roller $i$, carried by a lever I, attached to a rock shaft $i'$ and connected at its upper end to a transverse rod J, which is in turn connected with the noodle-folding mechanism by the adjustable rod J'. The rock shaft $i'$ extends transversely across the machine and carries another lever I* similar to the lever I and which is also connected with the rod J, as clearly shown in Fig. 5 of the drawings. Motion is imparted to the shaft of the rotary knife in the manner before described, and as this shaft is rotated a rotary motion is given through the sprocket wheel $e'$ and the chain $h$ to the cam H and shaft H', an oscillating motion is given to the levers I, I' and a reciprocating motion is given to the folding mechanism.

The endless belts or aprons L, L' are of ordinary construction and are operated in a well known way. As indicated, the belts are supported at their inner adjacent ends by rollers $l$ carried by vertically adjustable blocks L² which are supported on rods L³ adjustable vertically in the frame in a well known way. The rollers $l$ are provided with sprocket wheels $l'$ and the blocks L² carry sprocket idlers $l^2$. The chain L⁴ for driving the belts L, L' engages the sprocket wheels and idlers specified and also an idle sprocket wheel $l^3$ and this chain is operated by a sprocket wheel $e^2$ loose on the rod $d'$ and fast with a spur wheel $e^3$ which meshes with the pinion $e^4$ on the shaft of the rotary knife E. In this way the proper movement is given to the endless belts or carriers L, L' to move the noodles after being folded from the folding mechanism to their destination. The mechanism thus far described is similar to machines which have been already used for the purpose of folding noodles.

Figure 8:
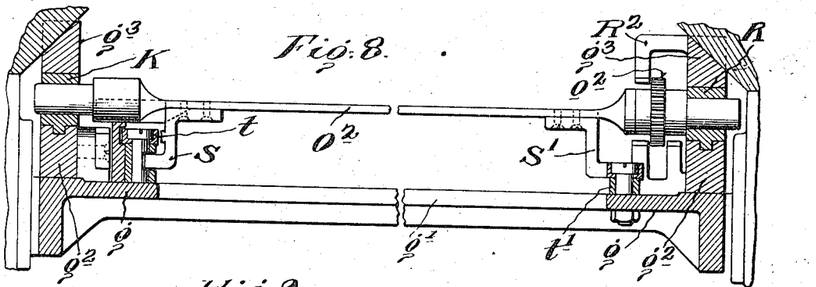
Fig. 8 is a detail view in section, showing one of the tables and certain mechanism connected therewith for operating it.
Figure 9:
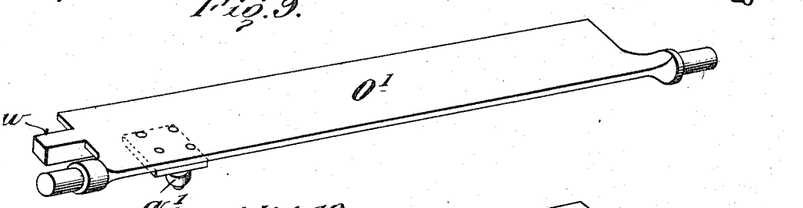
Fig. 9 is a perspective view of the first or front table in the series.
Figure 10:
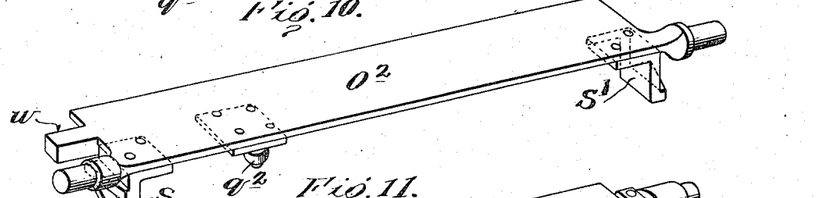
Fig. 10 is a similar view of the second table.
Figure 11:
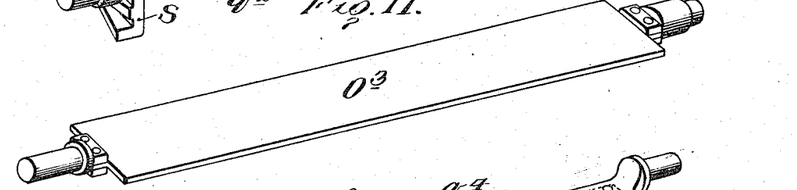
Fig. 11 is a perspective view of the third or middle table.
Figure 12:
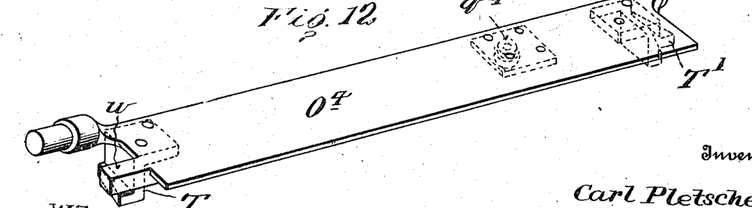
Fig. 12 is a perspective view of the fourth table in the series.

My improvements relate to the folding mechanism which will now be described. The frame for the folding mechanism is fastened in any suitable way to the main frame of the machine, about midway between its upper and lower ends. This frame comprises a bottom part $g$ which is for the most part closed but which is provided with an opening $g'$, as indicated. The frame has upwardly projecting side portions G², G³ each of which comprises a bottom rail $g^2$ and a top rail $g^3$. These two rails on each side are separated in such manner as to leave a space $g^4$ between them, and in said spaces $g^4$ are mounted slides K which are connected at their rear ends by a cross bar K' adjustably connected with the rod J' hereinbefore referred to. The slides K preferably have a tongue-and-groove connection with the rails $g^2$, as indicated for instance, in Fig. 8, and these slides are reciprocated back and forth in the spaces $g^4$ and carry with them the noodle-folding tables O', O², O³, O⁴, O⁵ which are connected with the slides in the manner presently to be described.

Figure 7:
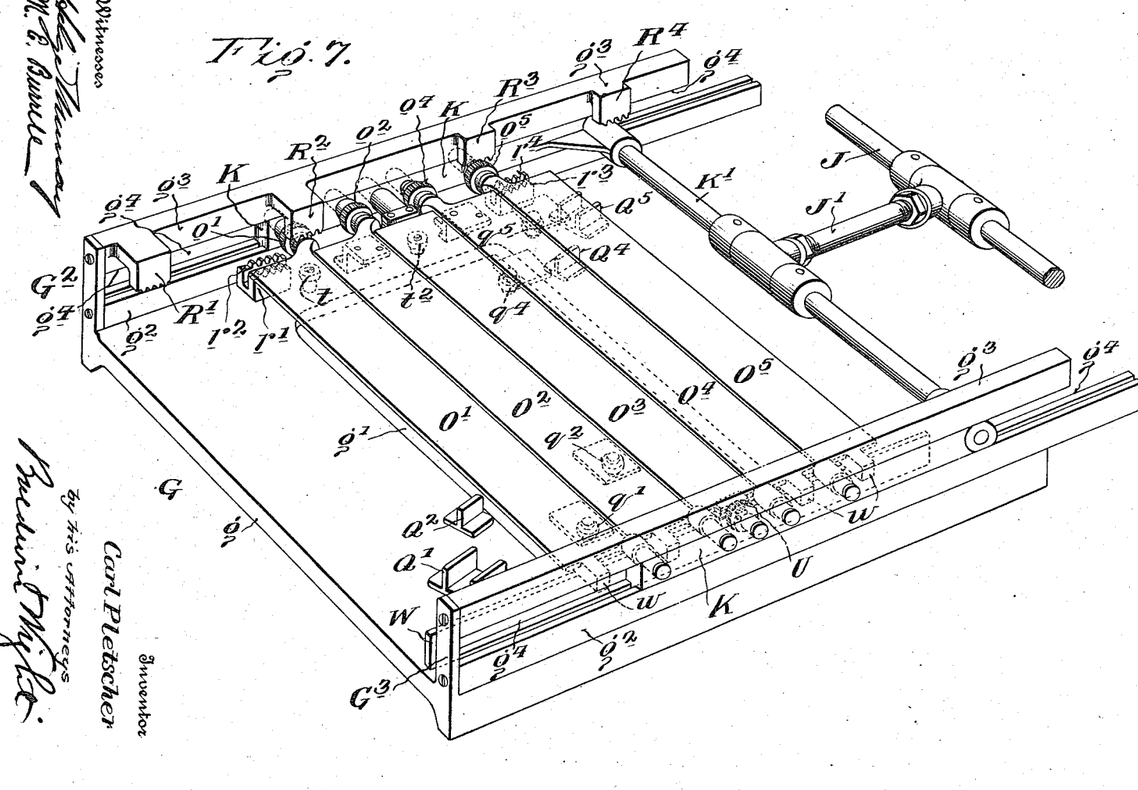
Fig. 7 is a perspective view of the folding mechanism.
Figures 26, 28, 29:
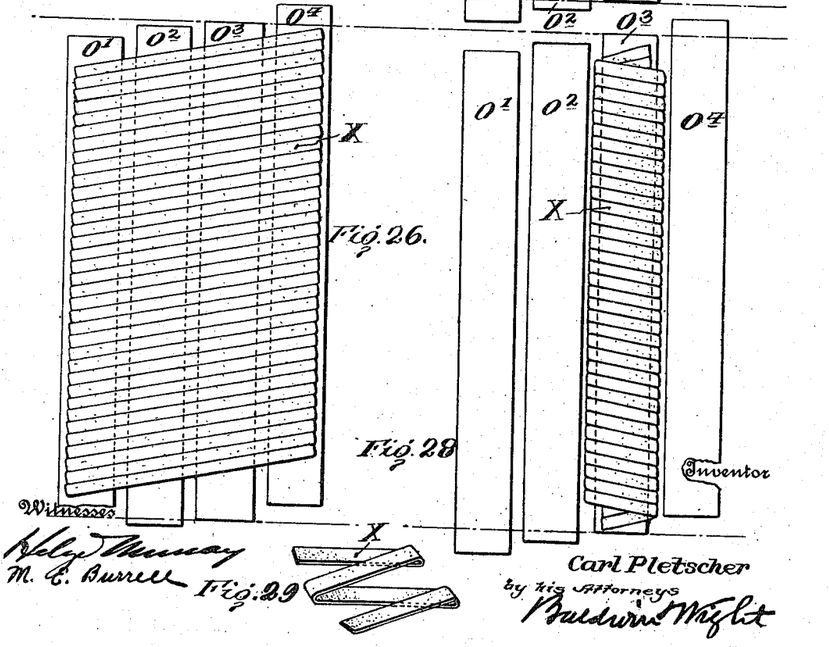
Fig. 26 shows how three of the tables are shifted laterally in opposite directions to cause the noodles to assume a position diagonal to the line of movement of the folding mechanism.
Fig. 28 shows how one of the folded ends of the series of noodles is folded over on the other portion thereof.
Fig. 29 is a perspective view, showing a portion of a completely folded noodle.

One of the sides G² of the folder frame is provided with a series of racks $R'$, $R^2$, $R^3$, $R^4$, best seen in Fig. 7 and also shown in other figures of the drawings. These racks are arranged above the plane of the opening $g^4$ of the side $G^2$ and beneath the plane of this opening on the bottom $g$ of the frame are arranged racks $r'$, $r^2$, $r^3$, $r^4$ also clearly shown in Fig. 7 of the drawings and elsewhere indicated. All of the racks above described are used to operate the folding tables at the proper times and in the proper manner, as will be hereinafter explained to give certain movements thereto. Each of the tables $O'$, $O^2$, $O^4$, $O^5$ is mounted to turn in the slides K, and each of said tables is provided with a pinion $o'$, $o^2$, $o^4$, $o^5$ adapted to engage certain of the racks before mentioned. The table $O^3$ is given a different movement from the other tables and other mechanism is employed for operating it. The tables $O'$, $O^2$, $O^4$, $O^5$ are given not only a turning or tilting movement to fold the noodles but also a sidewise movement relatively to their line of reciprocation for the purpose of staggering the noodle strips to cause them to assume the position shown in Fig. 26 of the drawings. This shifting of the tables is effected partly by the lugs $Q'$, $Q^2$, $Q^4$, $Q^5$ attached to the bottom $g$ of the folder frame which coöperate with rollers $q'$, $q^2$, $q^4$, $q^5$ projecting downwardly from the tables $O'$, $O^2$, $O^4$, $O^5$ and partly by means of rollers $t$, $t'$, $t^2$, $t^3$ projecting upwardly from the bottom $g$ of the folder frame which coöperate with cams S, T, S' and T' on the tables $O^2$ and $O^4$.

Figure 22:
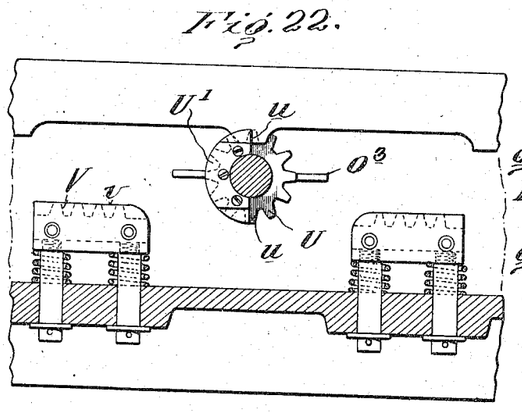
Figs. 22, 23 and 24 show further details of this mechanism.
Figure 23:
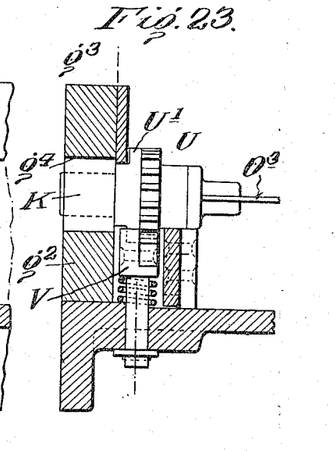
Figure 24:
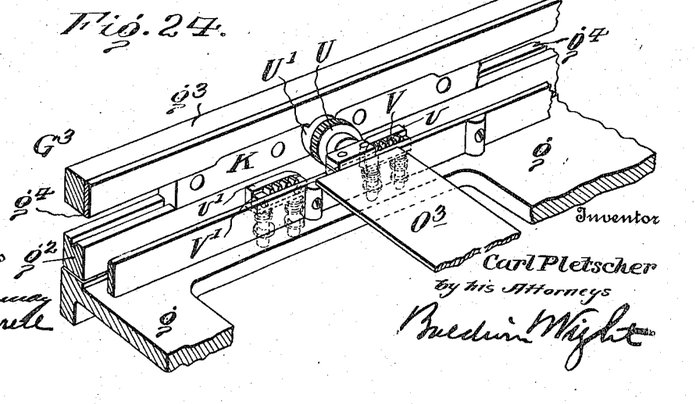

It will be understood, as before mentioned, that the tables are operated to fold and deliver two sets of noodles during each reciprocation or double stroke of the mechanism. When moving to the left or to the front of the machine the tables $O'$, $O^2$, $O^3$, $O^4$ are active and operate to fold a set of noodles. When moving to the right or rearwardly the tables $O^2$, $O^3$, $O^4$ and $O^5$ are active for this purpose, the table $O^3$ in both cases being employed to dump or deliver the noodles to the carrier belts below them. This table $O^3$ is pivotally connected at one end with one of the slides K and it is also pivotally connected at its opposite end with the corresponding slide on the opposite side of the machine. It carries a pinion U adapted to engage racks V, V' located in its path. These racks are spring-operated, as indicated in Fig. 22, and each rack has attached to it a plate $v$, the upper edge of which is in line with the upper edge of the teeth of the rack. The pinion U has secured to it a semi-circular plate U' which is adapted to engage the plates $v$, $v'$. The plate U' has a straight edge $u$, and the arrangement is such that at times the plate U' engages the plates $v$ or $v'$ and it depresses the rack V or V' so that the pinion U does not engage the teeth of the rack. At other times, the plate U' is in such position that it does not depress the rack V or V' and at this time the pinion U engages one of the racks V or V' and the table $O^3$ is revolved. The operation of this mechanism will be better understood in connection with the description of the operation of the folding mechanism as a whole and when following the different steps of the noodle-folding operation.

Figure 13:
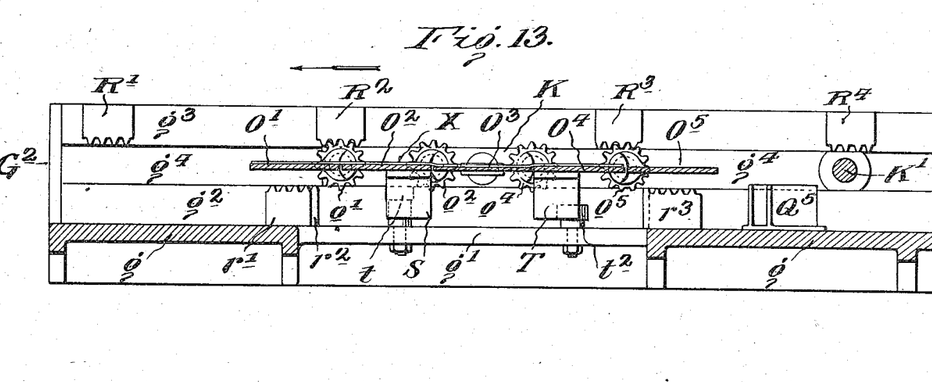
Fig. 13 is sectional view, showing the five folding tables in neutral position and supporting noodles ready to be staggered and folded.
Figure 14:
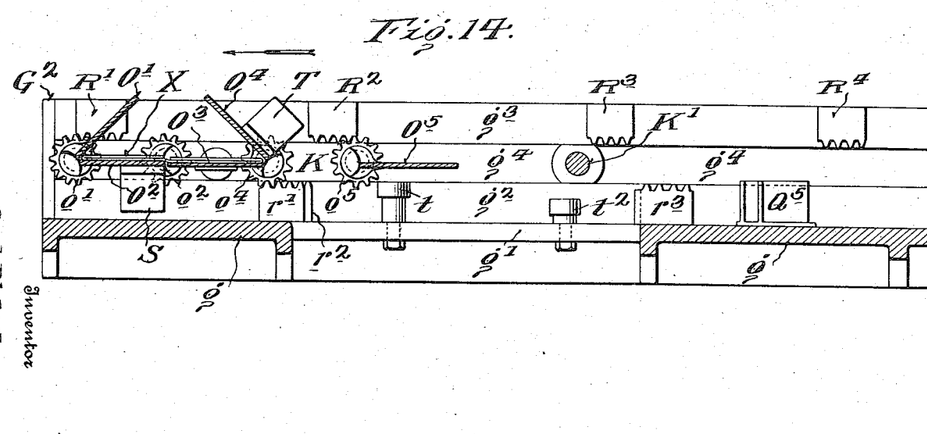
Fig. 14 is a similar view with the parts in a different position, the tables having been shifted sidewise to stagger the noodles and the latter having been partly folded.
Figure 15:
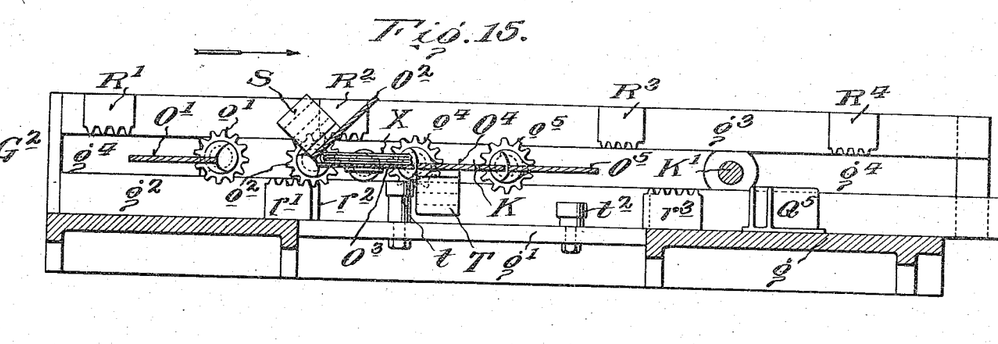
Fig. 15 is a similar view with the parts in still another position, the noodles being completely folded and ready to be delivered.
Figure 16:
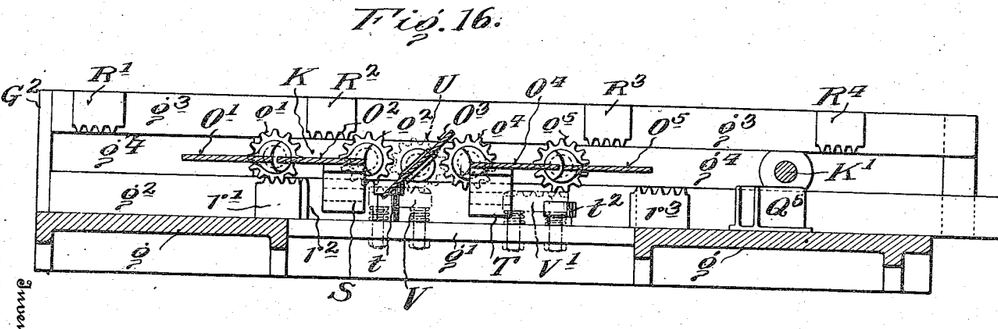
Fig. 16 shows the parts of the mechanism in the position they assume when the folded noodles are being delivered.
Figure 17:
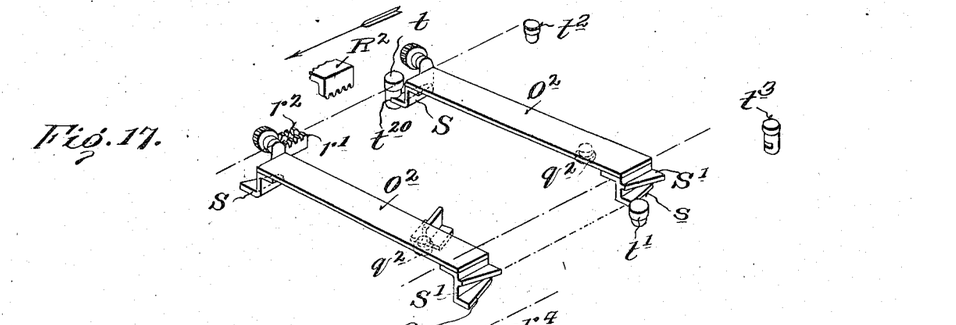
Figs. 17 to 20, inclusive, are diagrams, illustrating the manner in which the second and fourth tables in the series are operated.
Figure 18:
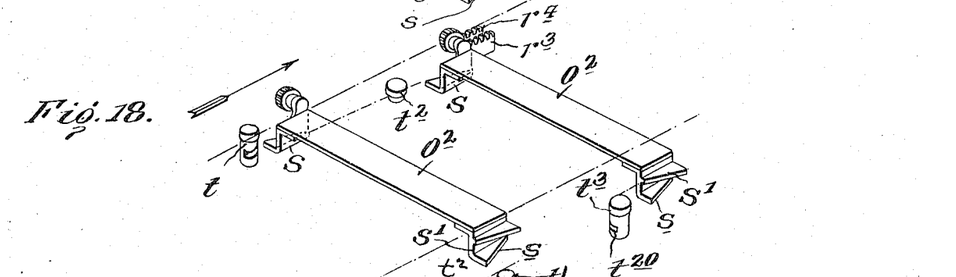
Figures 19, 20:
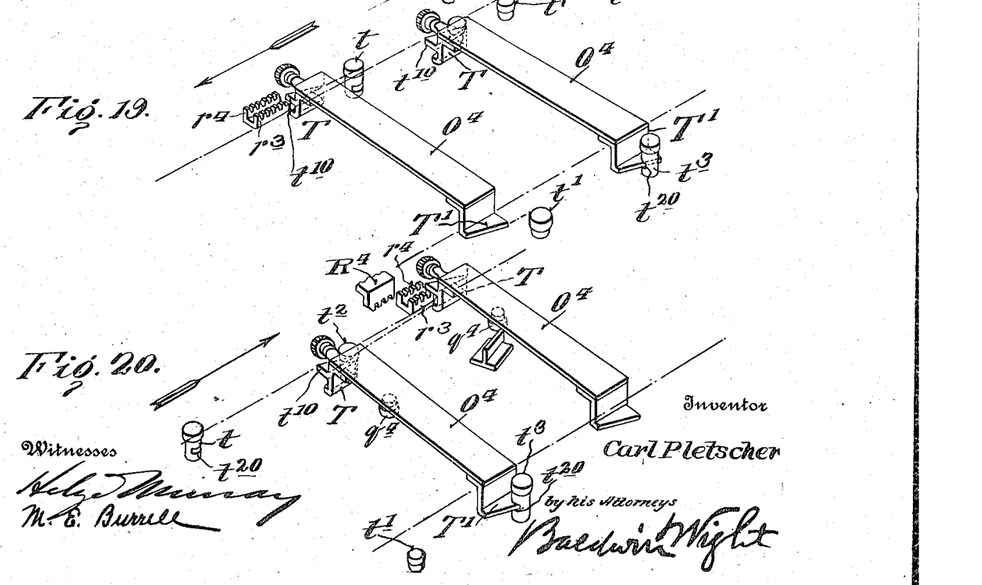
Figure 21:
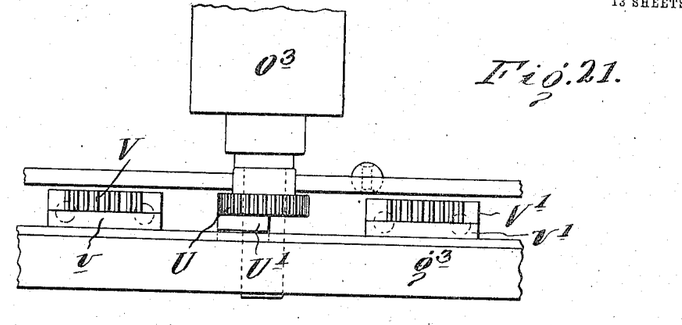
Fig. 21 is a detail view of part of the mechanism for operating the middle table or the one which effects the discharge of the folded noodles.
Figures 25, 27:
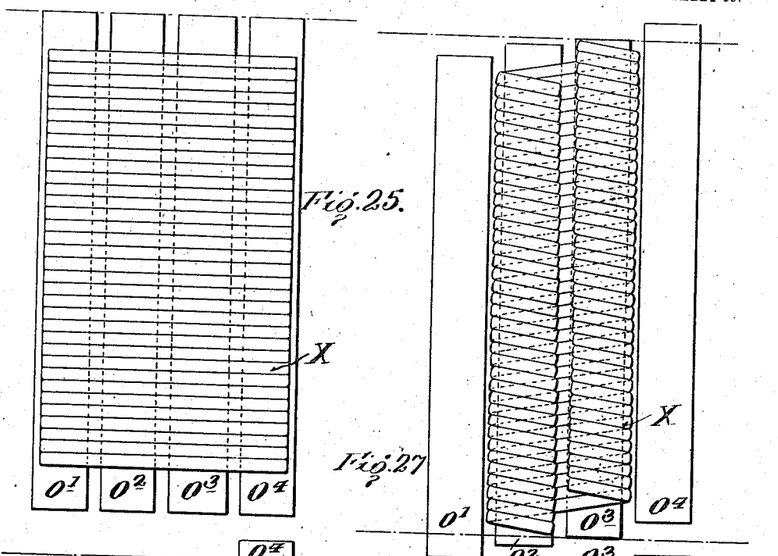
Fig. 25 shows how the strips or ribbons of dough after being cut to the proper length are deposited in a parallel condition on a set of four tables while they are in neutral position.
Fig. 27 shows how the noodles after having been arranged diagonally are folded at opposite ends.

The sheet of dough is divided into strips or ribbons in the manner before-described and these ribbons are cut into suitable lengths. While being thus cut these lengths of dough are deposited on the tables below them when the latter are in a neutral or flat horizontal position, as indicated for instance in Figs. 6, 7 and 13. Assuming that the folding mechanism is moving forward or to the left as viewed in the drawings, when in the position shown in Fig. 13 the noodle strips will lie on the tables in a parallel condition, as indicated in Fig. 25. As the tables move to the left (see Fig. 6) the rollers $q'$, and $q^2$ on the tables $O'$, $O^2$ will first engage the lugs $Q'$, $Q^2$. This will cause said tables $O'$, $O^2$ to be shifted slightly to one side and will bring the pinion $o'$ in line with the rack $R'$ and at the same time will bring the pinion $o^2$ of the table $O^2$ in line with the rack $r'$ but to the left thereof. The table $O^3$ is not shifted but as the tables move to the left the cam T' on the table $O^4$ engages the roller $t^1$ and the table $O^4$ is shifted in an opposite direction to that of the tables $O'$ and $O^2$ and the pinion $o^4$ comes into line with the rack $r^2$. The tables then have assumed the position shown in Fig. 26 of the drawings. It will be observed that the table $O^5$ at this time is neither shifted nor tilted, but as the tables move farther to the left the pinion $o'$ engages the rack $R'$ and when moved still farther to the left the tables $O'$ and $O^4$ will be tilted, in the manner indicated in Fig. 14, thus giving the first fold to the noodles which then rest on the tables $O^2$ and $O^3$, as indicated in Fig. 14. After this, the tables reverse their movements; that is to say, they move to the right and when so moving the pinion $o'$ which still engages the rack $R'$ is turned in the opposite direction to that of its first movement and the table $O'$ is reversed or brought back to its horizontal position, as indicated in Fig. 15. The pinion $o^4$ of the table $O^4$ which engages the rack $r^2$ is also reversed or turned in an opposite direction and causes table $O^4$ to be brought back to a horizontal position, as shown in Fig. 15. The pinion $o^2$ of the table $O^2$, it will be remembered, had on the forward movement been brought into line with the rack $r'$ and when the tables are moved to the right the pinion $o^2$ is turned by the rack $r'$ in such direction as to cause the table $O^2$ to be turned to the position shown in Fig. 15 and to thus fold a portion of the folded noodles over upon the other portion thereof (Fig. 15). As the tables move farther to the right, the pinion $o^2$ engages the rack $R^2$ and the table $O^2$ is brought back to a horizontal position (Fig. 16). At this time the pinion U engages the rack V and the table $O^3$ is revolved and causes the completely folded noodle to be delivered to the carrier belts. As the tables move to the right, the table $O'$ is shifted back to its neutral position by means of the lug $Q'$ which, it will be observed, has two parts $q^{10}$ and $q^{11}$. The table $O^2$ is also shifted back to its neutral position and this is done by the cam $s$ forming part of the cam $S'$ which cam $s$ engages the roller $t'$. The table $O^3$ is of course not shifted, but the table $O^4$ is shifted back to its neutral position by the cam $t^{10}$ forming part of the cam T which engages the roller $t^2$. After this the tables receive strips of dough which are folded in the manner next to be described during the movement of the tables to the right. At this time the table $O'$ is inactive, its pinion $o'$ being held out of line with the racks and its roller $q'$ not coming into contact with any shifting mechanism.

Figure 6:
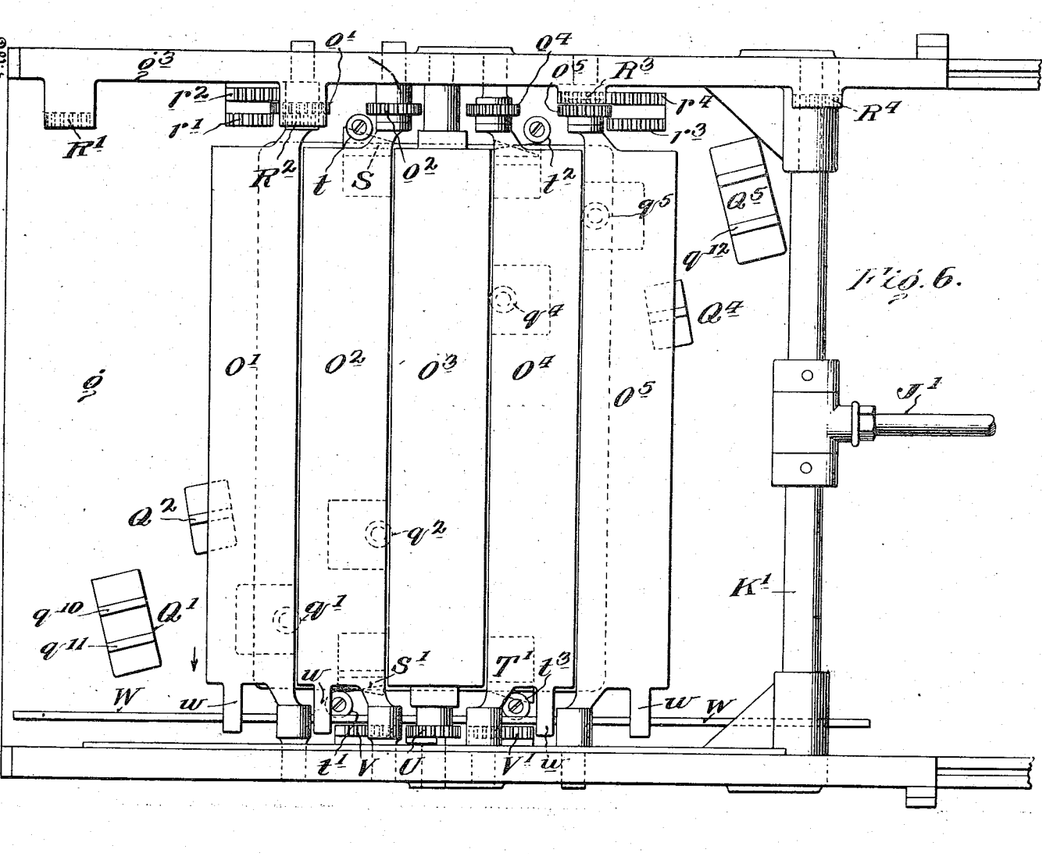
Fig. 6 is a view on an enlarged scale showing in plan the tables and parts of their operating mechanism.

Referring to Fig. 6, as the tables move to the right the roller $q^5$ comes in contact with the part $q^{12}$ of the lug $Q^5$ and the table $O^5$ is shifted upwardly, as viewed in Fig. 6. At the same time the roller $q^4$ on the table $O^4$ comes into engagement with the lug $Q^4$ and this table is also shifted upwardly as viewed in Fig. 6 but to a less extent. The table $O^3$ is of course not shifted, but the table $O^2$ is shifted by the roller $t^2$ which engages the cam S. As the tables continue to move to the right the pinion $o^5$ engages the rack $R^4$ and the table $O^5$ is tilted. During this same movement the pinion $o^2$ engages the rack $r^3$ and the table $O^2$ is tilted to fold the noodles in a similar manner to that indicated in Fig. 14. When the movement of the tables is reversed the table $O^5$ is brought back to a horizontal position by reason of the engagement of its pinion $o^5$ with the rack $R^4$, and the table $O^2$ is also brought back to horizontal position by means of the pinion $o^2$ and the rack $r^3$. The table $O^4$ is then tilted or turned in a similar manner to that shown in Fig. 15 by means of its pinion $o^4$ which at that time engages the rack $r^4$ and immediately afterward the table $O^2$ is returned to a horizontal position when its pinion $o^2$ engages the rack $R^3$. Immediately after this the pinion U of the table $O^3$ engages the rack $V'$ and the table $O^3$ is revolved to deposit the folded noodles on the carrier belts.

It will be observed that when the tables are moving to the left or forward in the folding operation first mentioned, the plate $U'$ engages the plate $v$ and therefore the pinion U is not revolved but on the return movement the pinion U does engage the rack V and causes the dumping table to be operated. In like manner, when the tables are moving to the right during the folding operation the semi-circular plate $U'$ engages the plate $v'$ and the pinion U is not operative, but on the return movement said pinion U engages the rack $V'$ and revolves the dumping table. It will also be observed that the rollers $t$ and $t^3$ are longer or higher than the rollers $t^1$, $t^2$ and the high rollers are slotted or recessed at $t^{20}$ so as to permit the lower cams $s$ and $t^{10}$ to pass by them, said cams $s$, $t^{10}$ being adapted to engage the low rollers $t'$, $t^2$. The tables $O'$, $O^2$, $O^4$, $O^5$ are provided with arms $w$ which rest at times on tables W which support and guide them. In this way noodles are folded and delivered during each reciprocation or each double stroke of the tables and therefore the output of the machine is double that of a machine in which the noodles are folded only once during a single reciprocation of the mechanism.

As before stated, my invention relates particularly to the folding mechanism and such mechanism may be embodied in machines involving the use of a different cutting mechanism than that hereinbefore shown and described.

I claim as my invention:—

1. A machine for folding noodles, comprising a series of horizontally arranged tables, means for simultaneously reciprocating them, means for tilting two of the tables toward each other during each reciprocation to give the first fold to the noodles, means for thereafter tilting another table during such reciprocation to fold the once-folded noodles upon themselves, means for moving another one of the tables during such reciprocation to dump the folded noodles, and mechanism for restoring the tables to their horizontal positions.

2. A machine for folding noodles, comprising a series of horizontally arranged tables, means for simultaneously reciprocating them, mechanism for shifting some of the tables laterally during each stroke thereof, means for tilting two of the tables toward each other during each reciprocation to give the first fold to the noodles, means for tilting another table during each reciprocation to fold the once-folded noodles upon themselves, means for moving another one of the tables during each reciprocation to dump the folded noodles, and mechanism for restoring the tables to their horizontal positions.

3. A machine for folding noodles, comprising a series of horizontally arranged tables, means for simultaneously reciprocating these tables in a horizontal plane, mechanism for tilting two of the tables during a single stroke to give the first fold to the noodles, means for tilting a third table to give the second fold to the noodles, mechanism for then operating a fourth table to dump the folded noodles, and means for restoring the tables to their horizontal positions.

4. A machine for folding noodles, comprising a series of horizontally arranged tables, means for reciprocating these tables simultaneously in the same horizontal plane, mechanism for operating three of the tables to fold the noodles during a single stroke in one direction of the tables, means for operating a fourth table during such stroke to dump the folded noodles, means for operating three of the tables during the return stroke to fold another set of noodles, and means for operating one of the tables to dump the folded noodles.

5. A machine for folding noodles, comprising a series of five horizontally arranged tables, means for reciprocating said tables simultaneously in the same horizontal plane, means for operating three of said tables during one stroke of a single reciprocation of the tables to fold the noodles over upon a fourth table, means for operating said fourth table to dump the noodles thus folded, means for operating during the return stroke, the second, fourth and fifth tables in the series to fold noodles over upon said fourth table (which is the third in the series), and means for operating said third table in the series to dump the noodles thus folded.

6. A machine for folding noodles, comprising a supporting frame, a series of horizontally arranged tables mounted to simultaneously slide therein, means for shifting some of said tables laterally, pinions carried by some of said tables, racks engaging said pinions to turn them at the proper times to give folds to the noodles, other racks engaging said pinions for restoring said tables to their horizontal planes, and mechanism for operating one of said tables twice during each complete reciprocation or double stroke to dump the folded noodles.

7. A machine for folding noodles, comprising a supporting frame, a series of horizontally arranged tables mounted to reciprocate therein, rollers carried by some of said tables, lugs on the supporting frame which engage the rollers and cause said tables to be shifted laterally, cams carried by some of said tables, rollers on the supporting frame which engage said cams and cause the cam-carrying tables to be shifted laterally, and mechanism for turning some of the tables to fold the noodles, and other mechanism for operating one of said tables to dump the folded noodles.

In testimony whereof, I have hereunto subscribed my name.

CARL PLETSCHER.

Witnesses:
EUNI STAEKLER,
M. L. JOHNSTON.